3,228,942
6-METHYL- AND 1,6-DIMETHYL ERGOLINE I
COMPOUNDS
Bruno Camerino, Alfredo Glaesser, and Bianca Patelli,
Milan, Italy, assignors to Società Farmaceutici Italia,
Milan, Italy, a corporation of Italy
No Drawing. Filed June 4, 1963, Ser. No. 285,228
Claims priority, application Italy, June 18, 1962,
12,158/62
12 Claims. (Cl. 260—285.5)

Our invention relates to 6-methyl- and 1,6-dimethyl-8-amino-methyl-ergolines I, which are therapeutically useful, and to the process of the preparation.

The new compounds of the invention are 6-methyl- and 1,6-dimethyl-ergolines I having the formula:

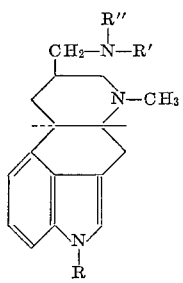

wherein:
R is hydrogen or methyl,
R' is an alkyl, cycloalkyl, or aryl radical having from 1 to 9 carbon atoms, and
R'' is a radical of an aliphatic, cycloaliphatic, aromatic or heterocyclic carboxylic acid having from 1 to 10 carbon atoms.

The compounds of our invention show a high oxytocic, antienteraminic, adrenolytic, hypotensive and sedative activity, both in vitro and in vivo and a low toxicity.

The symbol "I," following the name of an ergoline indicates that the hydrogen atom in the 10-position has the α-configuration.

The 6-methyl- and 1,6-dimethyl-8-carboxamidoergoline I derivatives monosubstituted at the amide nitrogen, also called dihydrolysergamide or 1-methyl-dihydro-lysergamide, which are the starting materials for the process of the invention, may be either D- or L-form or the corresponding racemic mixture and may be prepared by treatment of a mixed anhydride of the dihydrolysergic or 1-methyl-dihydrolysergic acid with a primary aliphatic, cycloaliphatic or aromatic amine having from 1 to 9 carbon atoms in the molecule.

Typical examples of amines, which may be employed in the process of the invention, are: methylamine, ethylamine, propylamines, n-mutylamine, iso-butylamine, amylamines, hexylamines, nonylamines, cyclopentylamine, cyclohexylamine, cyclopentylpropylamine, aniline, p-methyl-aniline p-ethylaniline, p-methoxy-aniline, p-phenetidine, benzylamine, and their analogues.

The process of the invention comprises reducing dihydro-D-lysergamide or 1-methyl-dihydro-D-lysergamide (A) monosubstituted at amide nitrogen with an alkyl, cycloalkyl or aryl radical to the corresponding derivative of dihydro-D-lysergamine (B) and, where appropriate, acylating to the corresponding amide derivative (C). The process may be illustrated by the reaction scheme:

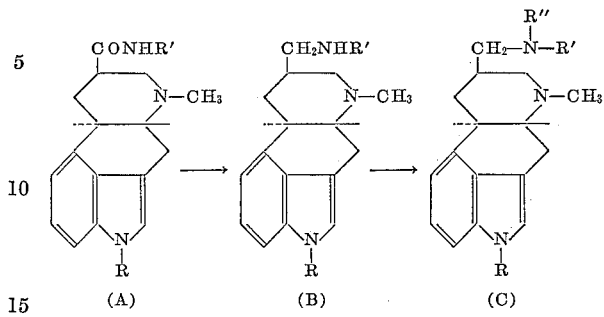

wherein R is selected from a group consisting of hydrogen and methyl; R' is selected from a group consisting of alkyl, cycloalkyl, and aryl radicals having from 1 to 9 carbon atoms; and R'' is a radical of an acid selected from the group consisting of aliphatic, cycloaliphatic, aromatic and heterocyclic carboxylic acids having from 1 to 10 carbon atoms.

The reduction of the monosubstituted amide nitrogen derivatives (A) is carried out with a reducing agent capable of reducing the amide group to an amine group, preferably lithium aluminum hydride. The reaction should be carried out at room temperature, but is preferably completed in the warm in the presence of a solvent, stable towards the reducing agent, such as an ether, for example, ethyl ether, propyl ether, tetrahydrofuran, ethylene glycol dimethyl ether and their analogues. The resulting amines may be isolated in crystalline form by concentrating the reaction mixture and then cooling. The corresponding N-acyl derivatives may be prepared by reacting the amines with an acylating agent such as the anhydride or the chloride of an aliphatic, cycloaliphatic or aromatic carboxylic acid having from 1 to 10 carbon atoms, in the optional presence of a tertiary amine, such as pyridine, diethylaniline, or triethylamine.

Typical examples of acyl derivatives, according to the invention, are those of the following acids: acetic, trimethylacetic, triethylacetic, propionic, butyric, valerianic, hexanoic, heptanoic, octanoic, decanoic, cyclopentane-carboxylic, cyclopentylpropionic, succinic, benzoic, 2,6-dimethoxy-benzoic, 3,4,5-trimethoxy-benzoic, phenylpropionic, phenoxy-acetic, α-phenoxy-propionic, ethylcarbonic, nicotinic acids and their analogues. The compounds of our invention are crystalline, colorless or yellowish solids, soluble in organic solvents and in acids.

In human therapy the products can be administered orally, intramuscularly, subcutaneously or intravenously, and are particularly useful in internal medicine (migraine, cephalea, nervous tachycardia, atony of the stomach, hyperthyroidism, Basedow disease, trigeminal neuralgia, peripheral vascular diseases) and in obstetrics and gynecology (metrorrhage, pueperium, curettage, abortion, pregnancy toxemia, uterine atonia).

The clinical doses for human beings range from 0.1 to 5 mg. per day of active principle according to the case. The pharmaceutical compositions usually employed include one or more compounds according to the invention with a therapeutically acceptable solid or liquid vehicle. Compositions suitable for oral administration may be tablets, powders, or pills, for example. Some excipients can be employed, among which the most suitable are starch, lactose, talc, magnesium stearate and their analogues.

The following examples serve to illustrate but not to limit the invention.

EXAMPLE 1

*N-p-phenethyl-dihydro-D-lysergamine*

7 g. of dihydro-D-lysergic acid are warmed with 150 cc. of anhydrous tetrahydrofuran and 3.65 cc. of triethylamine for 10 minutes at 50° C. To the mixture, externally cooled with an ice-salt mixture, 2.8 cc. of ethyl chlorocarbonate are slowly added with stirring which is continued for 5½ hours at 0° C. temperature. After filtration of the precipitate obtained, 3.34 cc. of p-phenetidine are added to the resulting mixed anhydride solution in tetrahydrofuran. The mixture is kept at room temperature overnight and after the removal of the solvent in vacuo, the residue is taken up with chloroform and methanol, and washed in sequence with water, 1% aqueous caustic soda solution and water. After distilling off the solvent in vacuo, the residue remaining is taken up with ether. 6.1 g. of N-p-phenethyl-dihydro-D-lysergamide, melting at 240–242° C., are filtered off.

1 g. of this N-p-phenethyl-dihydro-D-lysergamide is refluxed for 5 hours in 50 cc. of tetrahydrofuran with 1 g. of lithium aluminum hydride. The solution is concentrated and cooled, aqueous tetrahydrofuran is added to destroy the excess reducing agent and the solution is then diluted with methylene dichloride. The mixture is filtered, the filtration cake being washed with methylene dichloride, and the combined filtrate portions washed with water. After distilling off the solvent in vacuo, the residue crystallizes on the addition of ether. 0.800 g. of N-p-phenethyl-dihydro-D-lysergamine, melting at 218–220° C. are obtained.

EXAMPLE 2

*N-p-phenethyl-N-acetyl-dihydro-D-lysergamine*

0.6 cc. of acetyl chloride are added, at 0° C., to 0.700 g. of N-p-phenethyl-dihydro-D-lysergamine in 5 cc. of pyridine. The mixture is kept at 0° C. for 5 minutes and then at room temperature for a further 10 minutes. The solution is diluted with chloroform and methanol and washed in sequence with water, 1% aqueous caustic soda, and water. After distilling off the solvent, the residue crystallizes from acetone petroleum-ether. 0.500 g. of N-p-phenethyl - N-acetyl-dihydro - D-lysergamine, melting at 198–200° C. are obtained.

EXAMPLE 3

*N-p-phenethyl-N-benzoyl-dihydro-D-lysergamine*

The preparation is carried out as in Example 2, but employing benzoyl chloride as the acylating agent. N-p-phenethyl-N-benzoyl-dihydro-D-lysergamine, melting at 128–130° C., is obtained.

EXAMPLE 4

*N-p-phenethyl-N-carboethoxy-dihydro-D-lysergamine*

The preparation is carried out as in Example 2, but employing ethyl chlorocarbonate as the acylating agent. N - p - phenethyl - N - carboethoxy - dihydro - D - lysergamine, melting at 195–197° C., is obtained.

EXAMPLE 5

*N-methyl-dihydro-D-lysergamine*

The preparation is carried out as in Example 1, but employing methylamine instead of p-phenetidine. N-methyl-di-hydro-D-lysergamine, melting at 178–180° C. is obtained.

EXAMPLE 6

*N-cyclohexyl-dihydro-D-lysergamine*

The preparation is carried out as in Example 1, but employing cyclohexylamine in lieu of p-phenetidine. N-cyclohexyl-dihydro-D-lysergamine, melting at 198–200° C., is obtained.

EXAMPLE 7

*N-benzyl-dihydro-D-lysergamine*

The preparation is carried out as in Example 1, but employing benzylamine in lieu of p-phenetidine. N-benzyl-dihydro-D-lysergamine, melting at 210–212° C., is obtained.

EXAMPLE 8

*N-methyl-N-acyl-dihydro-D-lysergamine*

The preparation is carried out as in Example 2, except that N-methyl-dihydro-D-lysergamine, prepared as described in Example 5, is acylated. The following are some N - methyl - N - acyl - dihydro - D - lysergamines obtained:

N-methyl-N-acetyl-dihydro-D-lysergamine, melting at 278–280° C.;

N - methyl - N - benzoyl - dihydro - D - lysergamine, melting at 208–210° C.;

N - methyl - N - nicotinoyl - dihydro - D - lysergamine, melting at 188–190° C.;

N - methyl - N - carbethoxy - dihydro - D - lysergamine, melting at 135–137° C.

EXAMPLE 9

*N-cyclohexyl-N-acyl-dihydro-D-lysergamine*

The preparation is carried out as in Example 2, except that N-cyclohexyl-dihydro-D-lysergamine prepared as described in Example 6, is acylated. The following are some N-cyclohexyl-N-acyl-dihydro-D-lysergamines obtained.

N - cyclohexyl - N - acetyl - dihydro - D - lysergamine, melting at 130–132° C.;

N - cyclohexyl - N - benzoyl - dihydro - D - lysergamine, melting at 233–235° C.;

N - cyclohexyl - N - carbethoxy - dihydro - D - lysergamine, melting at 170–172° C.

EXAMPLE 10

*N-benzyl-N-acyl-dihydro-D-lysergamine*

The preparation is carried out as in Example 2, except that N-benzyl-dihydro-D-lysergamine prepared as described in Example 7 is acylated.

The following are some N-benzyl-N-acyl-dihydro-D-lysergamines prepared:

N-benzyl-N-acetyl-dihydro-D-lysergamine, melting at 188–190° C.;

N-benzyl-N-benzoyl-dihydro-D-lysergamine, melting at 235–237° C.;

N - benzyl-N-carbethoxy-dihydro-D-lysergamine, melting at 195–197° C.;

N - benzyl-N-propionyl-dihydro-D-lysergamine, melting at 178–180° C.;

N - benzyl - N - (α - phenoxy - propionyl) - dihydro-D-lysergamine, melting at 163–165° C.

EXAMPLE 11

*N-alkyl-(or aryl- or cycloalkyl)-N-acyl-1-methyl-dihydro-D-lysergamine*

The preparation of N-alkyl-(or aryl- or cycloalkyl)-N-acyl-1-methyl-dihydro-D-lysergamines may be carried out as in Examples 1 and 2, starting from 1-methyl-dihydro-D-lysergic acid instead of dihydro-D-lysergic acid.

We claim:
1. A compound of the D-lysergic acid series of the formula:

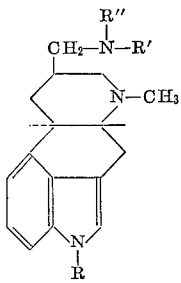

wherein:
R is selected from the group consisting of hydrogen and methyl;
R' is selected from the group consisting of saturated alkyl with 2–4 carbon atoms, of cyclopentyl and cyclohexyl, and of substituted and unsubstituted benzyl and phenyl in which the substituent is selected from the group consisting of alkyl and alkoxy with 1–3 carbon atoms;
R" is selected from the group consisting of
 (a) substituted and unsubstituted saturated aliphatic acids of up to 10 carbon atoms, wherein the substituent is selected from the group consisting of phenyl and phenoxy;
 (b) saturated cycloaliphatic acid of up to 8 carbon atoms, wherein the cycloaliphatic ring has 5 carbon atoms;
 (c) benzoic acid;
 (d) alkyl-carbonic acid, in which the alkyl is of from 1 to 4 carbon atoms;
 (e) nicotinic acid.

2. N-cyclohexyl-N-acetyl-dihydro-D-lysergamine.
3. N-cyclohexyl-N-benzoyl-dihydro-D-lysergamine.
4. N-cyclohexyl-N-carbethoxy-dihydro-D-lysergamine.
5. N-benzyl-N-acetyl-dihydro-D-lysergamine.
6. N-benzyl-N-benzoyl-dihydro-D-lysergamine.
7. N-benzyl-N-carbethoxy-dihydro-D-lysergamine.
8. N-benzyl-N-propionyl-dihydro-D-lysergamine.
9. N - benzyl - N - (α - phenoxypropionyl) - dihydro-D-lysergamine.
10. N-p-phenethyl-N-acetyl-dihydro-D-lysergamine.
11. N-p-phenethyl-N-benzoyl-dihydro-D-lysergamine.
12. N - p - phenethyl - N - carbethoxy - dihydro - D-lysergamine.

References Cited by the Examiner
FOREIGN PATENTS
674,061   8/1952   Great Britain.

OTHER REFERENCES

Burger: Medicinal Chemistry, 2nd ed., pages 585–6 and 622.
Noller: Chemistry of Organic Compounds, 2nd ed., page 244 (1951).
Stoll: Chemical Reviews, vol. 47, pp. 197–218 (1950).

NICHOLAS S. RIZZO, Primary Examiner.

DON M. KERR, DONALD G. DAUS,
*Assistant Examiners.*